United States Patent [19]

Hostetter

[11] 3,790,288
[45] Feb. 5, 1974

[54] PHOTOMETER INCLUDING VARIABLE AMPLIFICATION AND DARK CURRENT COMPENSATION

[75] Inventor: Joseph A. Hostetter, Fairport, N.Y.
[73] Assignee: Xerox Corporation, Stamford, Conn.
[22] Filed: Dec. 22, 1971
[21] Appl. No.: 210,966

[52] U.S. Cl. .................... 356/226, 250/214, 330/86
[51] Int. Cl. .............................................. G01j 1/44
[58] Field of Search ............ 356/226; 250/214, 206; 324/123; 328/142; 330/110, 86

[56] References Cited
UNITED STATES PATENTS

| | | | |
|---|---|---|---|
| 3,614,444 | 10/1971 | Nirschi | 330/110 |
| 3,509,474 | 4/1970 | Arnold et al. | 328/142 |
| 3,514,209 | 5/1970 | McGhee et al. | 250/214 |
| 3,664,752 | 5/1972 | Hermieu | 356/224 |
| 3,382,451 | 5/1968 | Gilette et al. | 324/123 |
| 3,667,036 | 5/1972 | Seachman | 324/123 |

Primary Examiner—Ronald L. Wibert
Assistant Examiner—Conrad Clark

[57] ABSTRACT

Apparatus for measuring the illumination from a source of light is disclosed in accordance with the teachings of the present invention wherein a photodiode exhibiting a substantially uniform spectral sensitivity within a defined range generates a current proportional to the intensity of illumination thereon. Operational amplifier means including a first operational amplifier having a constant closed loop amplification factor connected in series relationship with a second operational amplifier exhibiting a selectively variable closed loop amplification factor amplifies the current generated by said photodiode to provide a voltage that is proportional to the intensity of the illumination of said photodiode. Indicating means may be coupled to said operational amplifier means to provide an indication of the intensity of said illumination.

6 Claims, 2 Drawing Figures

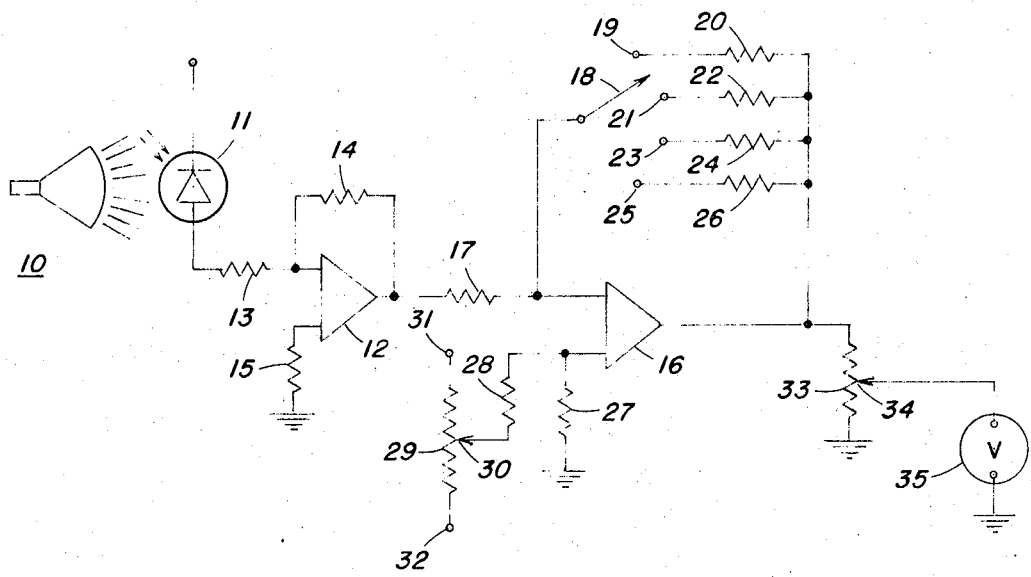

PHOTOMETER INCLUDING VARIABLE AMPLIFICATION AND DARK CURRENT COMPENSATION

This invention relates to apparatus for measuring the illumination from a source of light and more particularly to a light detector exhibiting linear stable operation in response to radiant flux of different wavelengths.

In many applications it is necessary to determine the intensity of light emitted by a source of light and incident on a surface. One such application resides in the manufacture and testing of electrophotographic reproducing devices. In these devices a photoconductive surface is exposed to a light image such that latent images are formed thereon. The latent images are then developed and transferred to a support surface. Further description of conventional electrophotographic devices may be found in U.S. Pat. No. 2,297,691 which issued to C.F. Carlson.

The light image to which the photoconductive surface is exposed is produced by modulating the light emitted by a light source with character patterns such as graphic information. For the successful operation of such electrophotographic devices, it is necessary that the intensity of unmodulated light transmitted to the photoconductive surface admit of a specified value. Accordingly during the course of manufacturing these devices the proper operation of the light source is determined by measuring the intensity of the illumination from said light source at a surface corresponding to the photoconductive surface.

The prior art has developed many devices for measuring the intensity of illumination at a surface. Most of these devices utilize phototubes which generate currents when radiant flux is incident on the surface thereof. An attendant disadvantage therewith is that the magnitude of the current generated by a conventional phototube is dependent upon the wavelength of incident light. In fact, most phototubes are characterized by a spectral sensitivity in the infrared region. However, most photoconductive materials conventionally utilized in electrophotographic devices respond to visible light and to light in the ultraviolet region of the spectrum. Therefore it is desirable to provide a light detector having a corresponding spectral sensitivity.

Another disadvantage of light measuring devices utilizing prior art phototubes is that the operation of such devices is stable only during short periods of time. Consequently these light measuring devices must be frequently calibrated and readjusted to assure desired performance.

Still another disadvantage is that light detectors heretofore developed by the prior art exhibit non-uniform operating characteristics. In other words, the operation of one such light detector may not necessarily correspond to the operation of a second light detector comprised of similar components. This factor tends to defeat the desired objective of standardization in measuring the intensity of illumination, resulting in test data that are not easily correlated.

Therefore it is an object of the present invention to provide an inexpensive light detector that exhibits stable operation over long periods of time.

It is a further object of this invention to provide a light detector having a substantially linear operating characteristic such that each of a plurality of like light detectors admits of identical operation.

It is still another object of this invention to provide a light detector for measuring the intensity of relatively low level illumination.

A still further object of this invention is to provide apparatus for measuring a broad range of intensity of radiant flux.

Another object of the present invention is to provide a light detector employing a photosensitive silicon device wherein the reverse saturation currents thermally generated by said device are minimized.

Various other objects and advantages of the invention will become clear from the following detailed description of exemplary embodiments thereof and the novel features will be particularly pointed out in connection with the appended claims.

In accordance with this invention, a light meter for measuring radiant flux of various wavelengths is provided wherein a photosensitive silicon device exhibiting a substantially uniform spectral sensitivity characteristic to radiant flux generates a current proportional to the intensity of the radiant flux received thereby which current is amplified by operational amplifier means; said operational amplifier means includes first and second series connected operational amplifiers having constant and selectively variable closed loop amplification factors, respectively; and the output of said operational amplifier means is applied to indicating means for providing an indication of the intensity of said received radiant flux.

The invention will be more clearly understood by reference to the following detailed description of exemplary embodiments thereof in conjunction with the accompanying drawings in which:

FIG. 1 is a schematic diagram of a first embodiment of a light meter in accordance with the present invention; and FIG. 2 is a schematic diagram of a second embodiment of a light meter in accordance with this invention.

Referring now to the drawings wherein like reference numerals are used throughout, and in particular to FIG. 1, there is illustrated a schematic diagram of a light meter in accordance with the present invention comprising a photodiode 11, operational amplifier 12, operational amplifier 16 and indicating device 35. The photodiode 11 may comprise a conventional silicon photodiode having a substantially uniform spectral sensitivity to radiant energy admitting of wavelengths in the range 400 to 1,000 millimicrons. A typical photodiode is identified as Model No. SGD444 and manufactured by Edgerton Germeshausen and Grier Inc. As is understood by those skilled in the art, photodiode 11 is adapted to generate a current proportional to the intensity of radiant flux incident thereon. Accordingly the photodiode 11 may be disposed in a plane at a desired distance from a source of light 10 whereat the intensity of the illumination from the source of light 10 is to be measured. The cathode of photodiode 11 is coupled to a source of biasing potential not shown, and the anode of the photodiode 11 is coupled to an input terminal of operational amplifier 12 by an input resistance means 13. If desired, a silicon phototransistor which exhibits operating characteristics that correspond to those of silicon photodiodes may be utilized in place of the photodiode 11. Accordingly the description set forth hereinbelow with reference to a photodiode is equally applicable to a phototransistor.

Operational amplifier 12 may comprise a conventional integrated circuit operational amplifier such as Motorola Model No. MC1539G or the equivalent. One skilled in the art will recognize that operational amplifier 12 exhibits high input impedance and a high open loop amplification factor. The operational amplifier 12 may comprise the aforementioned integrated circuit or may be constructed of conventional discrete components. In addition the operational amplifier may include an inverting input terminal and a noninverting input terminal. In the configuration illustrated in FIG. 1, input resistance means 13 is coupled to the inverting input terminal of operational amplifier 12, and resistance means 15 is coupled to the noninverting input terminal of operational amplifier 12. It is of course recognized that the foregoing input terminals of operational amplifier 12 may be readily interchanged. The resistance means 15 is coupled to ground potential and is a conventional drift stabilizing resistor normally utilized to insure stable operation of an operational amplifier, but may be omitted if so desired. The operational amplifier 12 further includes feedback resistance means 14 whereby the output terminal of said operational amplifier is coupled to the inverting input terminal thereof. Hence one skilled in the art will recognize that the operational amplifier 12 functions as a well-known inverting amplifier, and if the resistances of resistance means 13 and 14 respectively are fixed, the closed loop amplification factor is determined by the value of the resistance of resistance means 14 divided by the value of the resistance of resistance means 13. Although the input terminals of the operational amplifiers illustrated herein are designated inverting and non-inverting input terminals, such terminology is adopted merely for convenience. Clearly, either input terminal may be an inverting terminal. Furthermore, operational amplifiers having but a single input terminal may be utilized.

The output terminal of operational amplifier 12 is coupled to an inverting input terminal of operational amplifier 16 via resistance means 17. The latter operational amplifier may be similar to aforedescribed operational amplifier 12 and need not be explained in further detail herein. A non-inverting input terminal of operational amplifier 16 is coupled to a reference potential such as ground potential by resistance means 27 which comprises a drift stabilizing resistor. The non-inverting input terminal of the operational amplifier 16 is further coupled to an adjustable contact 30 of potentiometer 29 via resistance means 28 for a purpose soon to be described. The potentiometer 29 is connected in series relationship with terminals 31 and 32 which are adapted to be supplied with biasing potentials. The output terminal of operational amplifier 16 is adapted to be selectively coupled to the inverting input terminal thereof via common connected resistance means 20,22,24 and 26. Each of said resistance means has a first terminal thereof connected in common relationship to the output terminal of operational amplifier 16 and a second terminal thereof connected to stationary switch contacts 19, 21, 23 and 25 respectively. A moveable armature 18 is adapted to connect the inverting input terminal of operational amplifier 16 to one of said switch contacts 19 ... 25. The moveable armature 18 and stationary switch contacts 19 ... 25 preferably comprise a conventional rotary switch. However it is to be understood that other conventional switch means such as relay switch means, transistor switch means or the like may be utilized to selectively couple the output terminal of operational amplifier 16 to the inverting input terminal thereof via one of the resistance means 20 ... 26. It is now apparent that operational amplifier 16 is adapted to assume the configuration of an inverting amplifier having a closed loop amplification factor dependent upon the value of each of the selectively connectable resistance means 20 ... 26. If the value of the resistance of each of the resistance means 20 ... 26 is consecutively increased by an order of 10, it is understood that the amplification factor, or gain of the operational amplifier 16 may be selectively be 0, 20, 40, or 60 decibels in accordance with the positioning of moveable armature 18 with respect to the stationary switch contacts 19 ... 25. If desired, each of resistance means 20 ... 26 may have a first terminal thereof connected in common relationship to the inverting input terminal of operational amplifier 16 and moveable armature 18 may be connected to the output terminal of operational amplifier 16. Further, the input terminals of operational amplifier 16 may be readily interchanged.

The output terminal of operational amplifier 16 is additionally coupled to indicating means 35 via adjustable contact 34 of potentiometer 33. The indicating means 35 is adapted to display the voltage produced at said output terminal and therefore may comprise a conventional voltmeter such as a digital voltmeter, a vacuum tube voltmeter, cathode ray device or the like. It is preferable to employ a digital voltmeter such as a Fairchild Digital Voltmeter Model 7050. The potentiometer 33 admits of a resistance that is much less than the input impedance of the indicating means and is adjustable so that indicating means 35 may be calibrated in units of radiant flux density such as microwatts per square centimeter. Accordingly the voltage produced at the output terminal of operational amplifier 16 and applied to indicating means 35 may be utilized as a direct measure of the illumination of the photodiode 11.

The operation of the light meter schematically illustrated in FIG. 1 will now be described. The radiant energy transmitted by the source of light 10 is received as radiant flux on the surface of the photodiode 11 opposite thereto. The source of light 10 may comprise a conventional incandescent lamp, a fluorescent lamp or a source of monochromatic light. Inasmuch as photodiode 11 exhibits a substantially uniform spectral sensitivity characteristic to radiant flux having wavelengths in the range 400 – 1,000 millimicrons, a current will be generated thereby which current is proportional to the amount of incident radiant flux notwithstanding the spectral distribution of said flux. Photodiode 11 additionally generates reverse saturation currents due to the thermally generated minority carriers inherent in the silicon conductor material. These reverse saturation currents, which are temperature dependent, are commonly known as dark currents, and may exhibit a magnitude equal to the magnitude of the current generated in response to incident low level radiant flux.

The total current generated by photodiode 11 is supplied to resistance means 13 of the operational amplifier 12. The current is amplified by the operational amplifier 12 in accordance with the relative values of resistance means 13 and 14. A voltage is produced at the output terminal of operational amplifier 12 in response to the current supplied to resistance means 13. This voltage is applied to resistance means 17 of operational amplifier 16 whereby the applied voltage is selectively amplified. It is recognized that the applied voltage includes a component dependent upon the dark currents generated by photodiode 11. This component, if additionally amplified, results in erroneous indications of the intensity of the radiant flux incident on photodiode 11. Accordingly the noninverting input terminal of operational amplifier 16 is supplied with a current adapted to compensate for and counterbalance the aforementioned dark currents. Thus the voltage potential applied to terminals 31 and 32 induces a voltage potential across potentiometer 29 such that contact 30 supplies resistance means 28 with a compensating current. The relative position of contact 30 may be adjusted such that the effects of the dark currents on operational amplifier 16 are substantially mitigated.

The voltage produced at the output terminal of operational amplifier 16 is proportional to the voltage produced at the output terminal of operational amplifier 12 in accordance with the relative values of resistance means 17 and a selected one of resistance means 20 . . . 26. The indicating means 35 may provide a visual indication of the voltage produced at the output terminal of operational amplifier 16. Adjustable contact 34 of potentiometer 33 may be so adjusted as to supply indicating means 35 with a portion of the voltage produced at the output terminal of operational amplifier 16 so that indicating means 35 provides a direct indication of the radiant flux incident on photodiode 11. Hence potentiometer 33 serves to accuractely calibrate the indicating means 35. It should be readily apparent that if the magnitude of the voltage produced at the output terminal of operational amplifier 16 is not sufficient to result in a satisfactory indication by indicating means 35, the gain of the operational amplifier 16 may be selectively increased by properly positioning moveable armature 18. Alternatively if the magnitude of the voltage produced at the output terminal of operational amplifier 16 is too great the gain of the operational amplifier may be selectively decreased by a corresponding positioning of moveable armature 18.

The aforementioned dark currents may be counterbalanced by the proper disposition of adjustable contact 30 of potentiometer 29. In the absence of radiant flux incident on photodiode 11, dark currents supplied to resistance means 13 will result in a voltage produced at the output terminal of operational amplifier 16 and a corresponding indication thereof by indicating means 35. Consequently the adjustable contact 30 of potentiometer 29 should be uniquely disposed to provide a voltage at the non-inverting input terminal of operational amplifier 16 that is equal to the dark current voltage applied to the inverting input terminal of operational amplifier 16. The applied voltages will cancel each other so that a null voltage of substantially zero magnitude will be produced at the output terminal of operational amplifier 16, and indicating means 35 will correctly indicate that radiant flux of substantially zero intensity is incident on photodiode 11. Further adjustment of contact 30 is not necessary since it is recognized that the drak currents generated by photodiode 11 are independent of incident radiant flux.

Although operational amplifier means comprised of first and second stages are illustrated in FIG. 1, it is obvious that the number of stages utilized may be increased or decreased in accordance with the degree of amplification desired while, preferably, maintaining a linear operation of the illustrated apparatus. In addition, the relative connections between the first and second stages of the operational amplifier means may be interchanged such that the operational amplifier exhibiting the selectively variable closed loop amplification factor may be disposed in a preceding series relationship with respect to the operational amplifier exhibiting the constant closed loop amplification factor. Furthermore one skilled in the art will recognize that conventional frequency compensating circuits may be connected to each of operational amplifiers 12 and 16 to linearize the frequency responce to each amplifier. Accordingly, the light meter in accordance with the present invention accurately measures illumination from light sources having substantially constant outputs or from light sources having frequency variable outputs. The illustrated light meter may also be utilized to measure the illumination from a conventional flash lamp.

Referring now to FIG. 2 there is schematically illustrated another embodiment of the present invention comprising silicon photosensitive device 41, differential amplifier means 42, operational amplifiers 57 and 59, and indicating means 70. The silicon photosensitive device 41 is similar to the aforementioned device 11 and may comprise a photodiode or a phototransistor adapted to produce a current proportional to the intensity of radiant flux incident thereon from light source 10. The cathode of photosensitive device 41 is supplied with a biasing voltage, and the anode thereof is coupled to a first input terminal of differential amplifier means 42. A second input terminal of differential amplifier means 42 is coupled to dark current compensating means further described below. The differential amplifier means 42 is capable of providing an output voltage proportional to the difference between the input voltages supplied thereto. Such differential amplifier means are well-known in the art and need not be described in detail herein. It should be noted however that in the present application thereof it is desirable to provide differential amplifier means having low noise characteristics and high input impedance. Accordingly, the differential amplifier means 42 may include conventional field effect transistors, such as model 40673 manufactured by RCA, or may comprise an integrated circuit FET differential amplifier.

Differential amplifier means 42 is coupled to operational amplifier 57 which may be similar to aforedescribed operational amplifier 16. Hence the operational amplifier 57 functions as an inverting amplifier having a selectively variable closed loop amplification factor. The output terminal of operational amplifier 57 is coupled to a moveable armature 56 similar to the moveable armature 18 and adapted to selectively couple one of stationary switch contacts 49, 51, 53, and 55 to the output terminal of operational amplifier 57 in accordance with the relative disposition of said moveable armature. Each of the stationary switch contacts 49 . . . 55 is coupled to one terminal of an associated common connected resistance means 48, 50, 52 or 54. The common connected terminals of the resistance means 48 . . . 54 are coupled to an input terminal of differential amplifier means 42. The closed loop amplification factor of operational amplifier 57 is determined by the relative magnitudes of the resistance of resistance means 48 . . . 54 and the relative disposition of moveable armature 56.

The output terminal of operational amplifier 57 is additionally coupled to operational amplifier 59 via resistance means 58. The operational amplifier 59 is similar to aforedescribed operational amplifier 12 and is adapted to operate as a conventional inverting amplifier. The output terminal of operational amplifier 59 is connected to an input terminal thereof via a feedback circuit comprised of fixed resistance means 60 and adjustable resistance means 61. The adjustable resistance means 61 may comprise a manually adjustable resistance means such as a potentiometer, a rheostat or the like, and serves as calibration means. Thus the adjustable resistance means 61 in conjunction with operational amplifier 59, performs substantially the same function as potentiometer 33 of FIG. 1. Another input terminal of operational amplifier 59 is coupled to a reference potential such as ground potential via resistance means 62. The purpose of resistance means 62 is similar to that of aforedescribed resistance means 15. Said other input terminal of operational amplifier 59 is additionally coupled to an offset compensating network via resistance means 63. The offset compensating network is comprised of potentiometer 64 having adjustable contact 65 and voltage supply terminals 66 and 67. It will be understood from the description set forth hereinafter that the offset voltage inherent in operational amplifier 59 is minimized by the proper positioning of adjustable contact 65.

Indicating means 70 is similar to aforementioned indicating means 35 and is adapted to provide an indication of the amount of radiant flux incident on photosensitive device 41 from light source 10. Accordingly indicating means 70 may comprise a conventional voltmeter or the like responsive to a voltage supplied thereto. The indicating means 70 is coupled to the output terminal of operational amplifier 59 via the adjustable contact 69 of potentiometer 68. The potentiometer is adapted for calibration of the indicating means 70 whereby an indication may be directly obtained in units of radiant flux per unit area such as microwatts per square centimeter. If desired, the potentiometer 68 may be omitted and indicating means 70 may be connected directly to the output terminal of operational amplifier 59 whereby adjustable resistance means 61 provides suitable calibration means therefor.

In operation, the photosensitive device 41 supplies a first input terminal of differential amplifier means 42 with a current proportional to the intensity of the radiant flux thereon from light source 10. It is recalled that the current produced by photosensitive device 41 includes a component consisting of dark currents. A second input terminal of differential amplifier means 42 is supplied with a compensating current equal in magnitude to the dark currents by resistor means 47. The compensating current is produced by inducing a voltage across potentiometer 43 and by selectively positioning adjustable contact 44 so as to obtain a desired magnitude of compensating current. As is understood by those skilled in the art, the voltage produced by differential amplifier means 42 and supplied to the input terminals of operational amplifier 57 is proportional to the difference between the voltages supplied to the differential amplifier means. Hence if the compensating current is equal to the dark current, the difference therebetween is zero, and the response of operational amplifier 57 to the dark currents is minimized. It is noted that although the use of differential amplifier means 42 for minimizing the dark currents is preferable such differential amplifier means may be omitted and the compensating current may be supplied directly to an input terminal of operational amplifier 57 by resistor means 47.

The magnitude of the voltage produced at the output terminal of operational amplifier 57 is dependent upon the selected closed loop amplification factor of said operational amplifier as determined by the disposition of moveable armature 56 and the relative resistance of resistance means 48 . . . 54. This has been discussed in detail with respect to the operational amplifier 16 of FIG. 1 and further explanation thereof is not necessary. It should, however, be noted that the produced voltage is a function of the input current and said relative resistance. The amplified voltage produced at the output terminal of operational amplifier 57 is further amplified by operational amplifier 59. It is understood that the gain of operational amplifier 59 is determined by the sum of the resistances of resistance means 60 and 61 divided by the resistance of resistance means 58. This gain may be varied for the purposes of calibrating the indicating means 70 by an adjustment of adjustable resistance means 61. If such calibration is not necessary, adjustable resistance means 61 may be omitted.

The phenomenon of offset inherent in the operation of operational amplifier 59 is minimized by providing a compensating voltage to an input terminal thereof. The magnitude of this compensating voltage is substantially equal to the inherent offset voltage and is derived by selectively positioning adjustable contact 65 of the potentiometer 64 to which is applied a voltage potential. The magnitude of the current associated with said compensating voltage is effectively limited by current limiting resistance means 63. Thus an offset voltage that may be assumed to be present at an inverting input terminal of operational amplifier 59 is effectively counterbalanced by the compensating voltage supplied to the noninverting input terminal thereof. Accordingly the voltage produced at the output terminal of operational amplifier 59 is linearly proportional to the intensity of the luminous flux incident on photosensitive device 41, the dark currents and inherent offset voltages having been minimized.

The visual indication of the voltage produced at the output terminal of operational amplifier 59 is provided by indicating means 70. Said visual indication may be in units of light flux if adjustable resistance means 61 and potentiometer 68 are properly adjusted. Although the combination of adjustable resistance means 61 and potentiometer 68 admit of accurate calibration of the indicating means 70 it is apparent that satisfactory calibration may be obtained by utilizing only one of these components.

It should be clear from the foregoing description that the present invention is effective to provide an accurate, time stable, linearly operating light meter for measuring the illumination from a source of light including a broad range of wavelengths. A plurality of light meters constructed as described hereinabove will exhibit substantially identical operating characteristics.

While the invention has been particularly shown and described with reference to two embodiments thereof, it will be obvious to those skilled in the art that various changes and modifications in form and details may be made without departing from the spirit and scope of the invention. For example, the operational amplifiers described above may include field effect transistors to provide optimum noise characteristics. In addition the switch means comprised of a moveable armature and stationary switch contacts may be replaced by other switch means such as relay switches, transistor switches or the like. Furthermore the compensating circuits utilized to counteract the effects of dark currents and offset voltages may be replaced by other conventional means adapted to satisfy the necessary objectives, and indicating means 35 and 70 may be calibrated to indicate the intensity of illumination from the source of light 10 in any desirable measuring units such as lumens per square meter or other conventional units of power. The exemplary use of the light meter of the present invention is not limited to those applications described hereinabove but encompasses all possible applications wherein a measure of illumination is desired. It is therefore intended that the appended claims be interpreted as including the foregoing and various other changes, modifications, and applications.

What is claimed is:

1. Apparatus for measuring the illumination from a source of light, comprising:
    a photodiode for producing a current proportional to the intensity of illumination thereon; said photodiode being responsive to light having wavelengths in the range 400 to 1000 millimicrons;
    a differential amplifier coupled to said photodiode for receiving the current therefrom; said differential amplifier being characterized by a high input impedance;
    operational amplifier means coupled to said differential amplifier for amplifying said current; said operational amplifier means including first and second series connected operational amplifiers, said first operational amplifier exhibiting a constant closed loop amplification factor and said second operational amplifier exhibiting a selectively variable closed loop amplification factor;
    adjustable means coupled to said differential amplifier for compensating the reverse saturation current thermally generated by said photodiode to mitigate the response of said operational amplifier means to said reverse saturation current; and
    means coupled to said operational amplifier means and responsive to said amplified current for indicating the intensity of illumination on said photodiode.

2. The apparatus of claim 1 wherein said adjustable means comprises a potentiometer having an adjustable contact, said potentiometer having a voltage potential induced thereacross.

3. A light meter for determining the illumination on a plane from a source of light by measuring the amount of radiant flux received at said plane, comprising:
    a photodiode for generating a current proportional to the amount of radiant flux incident thereon, said photodiode being characterized by a substantially uniform spectral sensitivity to radiant flux exhibiting wavelengths in the range 400 to 1,000 millimicrons;
    compensating means coupled to said photodiode for minimizing thermally generated reverse saturation currents inherent in the current generated by said photodiode;
    indicating means responsive to a voltage applied thereto for providing an indication of said applied voltage;
    first operational amplifier means coupled to said compensating means, said first operational amplifier means including a feedback circuit comprised of a plurality of resistance means connected in common relationship, each of said resistance means having a distinct value of resistance, and switch means selectively connectable in series with one of said common connected resistors, to thereby provide a selectively variable closed loop amplification factor; and
    second operational amplifier means intercoupling said first operational amplifier means and said indicating means, said second operational amplifier means having a continuously variable amplification factor to effect calibration of said indicating means whereby said indication of said applied voltage is in units of radiant flux per unit area.

4. A light meter in accordance with claim 3 wherein said compensating means comprises:
    a potentiometer having an adjustable contact, said potentiometer being supplied with a voltage potential; and
    a differential amplifier having a first input terminal coupled to said adjustable contact and a second input terminal coupled to said photodiode for supplying said first operational amplifier means with an input voltage.

5. A light meter for measuring radiant flux of different wavelengths received from a source of radiant energy, comprising:
    a photodiode exhibiting a substantially uniform spectral sensitivity characteristic to said received radiant flux for generating a current proportional to the amount of received radiant flux;
    a first operational amplifier arranged in closed loop configuration and coupled to said photodiode, said first operational amplifier being characterized by a fixed closed loop amplification factor;
    a second operational amplifier arranged in closed loop configuration and coupled to said first operational amplifier;
    a plurality of resistance means selectively connectable in the closed loop configuration of said second operational amplifier such that said second operational amplifier is characterized by a selectively variable closed loop amplification factor;
    adjustable dark current compensating means comprised of an adjustable potentiometer coupled to an input of said second operational amplifier for minimizing the response of said second operational amplifier to reverse saturation currents thermally generated by said photodiode; and
    indicating means coupled to an output of said second operational amplifier and responsive to a voltage produced by said second operational amplifier for providing an indication of the amount of radiant flux received by said photodiode.

6. A light detector circuit having an improved dark current compensating circuit comprising, in combination:
    a photodiode for producing a current proportional to the intensity of luminous flux incident thereon;

a potentiometer having an adjustable contact, said potentiometer being supplied with a voltage potential;

a differential amplifier having a first input terminal connected to said photodiode and a second input terminal connected to said adjustable contact;

operational amplifier means connected to an output terminal of said differential amplifier, said operational amplifier means having a selectively variable closed loop amplification factor;

and indicating means, responsive to a voltage supplied by said operational amplifier means to indicate the intensity of the luminous flux incident on said photodiode.

* * * * *